United States Patent
Xu et al.

(10) Patent No.: US 10,430,013 B2
(45) Date of Patent: Oct. 1, 2019

(54) TOUCH SUBSTRATE AND MANUFACTURING METHOD THEREOF, DISPLAY DEVICE, FINGERPRINT DETERMINATION DEVICE AND METHOD FOR DETERMINING FINGERPRINT

(71) Applicant: BOE Technology Group Co., Ltd., Beijing (CN)

(72) Inventors: Rui Xu, Beijing (CN); Xue Dong, Beijing (CN); Jing Lv, Beijing (CN); Haisheng Wang, Beijing (CN); Chun Wei Wu, Beijing (CN); Yingming Liu, Beijing (CN); Yuzhen Guo, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/750,433

(22) PCT Filed: Jun. 29, 2017

(86) PCT No.: PCT/CN2017/090869
§ 371 (c)(1),
(2) Date: Feb. 5, 2018

(87) PCT Pub. No.: WO2018/040713
PCT Pub. Date: Mar. 8, 2018

(65) Prior Publication Data
US 2019/0018523 A1    Jan. 17, 2019

(30) Foreign Application Priority Data
Aug. 30, 2016   (CN) .......................... 2016 1 0772827

(51) Int. Cl.
*G06F 3/047*       (2006.01)
*G06F 3/044*       (2006.01)
(Continued)

(52) U.S. Cl.
CPC ............... *G06F 3/047* (2013.01); *G02B 5/30* (2013.01); *G06F 3/044* (2013.01); *G06K 9/0002* (2013.01)

(58) Field of Classification Search
CPC . G02B 5/30; G06F 3/044; G06F 3/047; G06F 3/0412; G06F 3/0416;
(Continued)

(56) References Cited

U.S. PATENT DOCUMENTS 2,665,243 A  *  1/1954  Hain ....................... C25D 11/24
                                                                205/139
2013/0249850 A1   9/2013  Bulea
(Continued)

FOREIGN PATENT DOCUMENTS

CN     103941936 A     7/2014
CN     103970392 A     8/2014
(Continued)

OTHER PUBLICATIONS

Sep. 30, 2017—(WO) International Search Report and Written Opinion Appn PCT/CN2017/090869 with English Tran.
(Continued)

*Primary Examiner* — Richard J Hong
(74) *Attorney, Agent, or Firm* — Banner & Witcoff, Ltd.

(57) ABSTRACT

A touch substrate and its manufacturing method thereof, a display device, a fingerprint determination device and a method for determining a fingerprint are provided. The touch substrate touch driving electrodes, touch sensing electrodes and signal lines on a base substrate which at least includes a first region and a second region. The plurality of touch driving electrodes include a plurality of first touch driving electrodes in the first region and a plurality of second touch driving electrodes in the second region, and each first touch driving electrode and one second touch driving elec-
(Continued)

trode are connected with a same signal line; and/or the plurality of touch sensing electrodes include a plurality of first touch sensing electrodes in the first region and a plurality of second touch sensing electrodes in the second region, and each first touch sensing electrode and one second touch sensing electrode are connected with a same signal line.

20 Claims, 5 Drawing Sheets

(51) Int. Cl.
*G02B 5/30* (2006.01)
*G06K 9/00* (2006.01)

(58) Field of Classification Search
CPC ............. G06K 9/0002; G06K 9/00013; G01R 27/2605; C25D 11/24
See application file for complete search history.

(56) References Cited

U.S. PATENT DOCUMENTS

| | | | |
|---|---|---|---|
| 2015/0116243 A1 | 4/2015 | Saitou et al. | |
| 2016/0026842 A1* | 1/2016 | Withers | G01R 27/2605 |
| | | | 324/686 |
| 2016/0098113 A1 | 4/2016 | Ding et al. | |
| 2016/0162084 A1* | 6/2016 | Wang | G06F 3/0412 |
| | | | 345/173 |
| 2017/0185225 A1 | 6/2017 | Ding et al. | |
| 2017/0205933 A1* | 7/2017 | Kwon | G06F 3/0416 |
| 2017/0206392 A1 | 7/2017 | Zhu | |
| 2018/0039815 A1* | 2/2018 | Jung | G06K 9/00013 |

FOREIGN PATENT DOCUMENTS

| | | |
|---|---|---|
| CN | 104375725 A | 2/2015 |
| CN | 104571756 A | 4/2015 |
| CN | 104571769 A | 4/2015 |
| CN | 104932753 A | 9/2015 |
| CN | 105183262 A | 12/2015 |
| CN | 105511705 A | 4/2016 |
| CN | 105786264 A | 7/2016 |
| CN | 106354351 A | 1/2017 |

OTHER PUBLICATIONS

Sep. 5, 2018—(CN) First Office Action Appn 201610772827.3 with English Translation.

* cited by examiner

TOUCH SUBSTRATE AND MANUFACTURING METHOD THEREOF, DISPLAY DEVICE, FINGERPRINT DETERMINATION DEVICE AND METHOD FOR DETERMINING FINGERPRINT

The application is a U.S. National Phase Entry of International Application No. PCT/CN2017/090869 filed on Jun. 29, 2017, designating the United States of America and claiming priority to Chinese Patent Application No. 201610772827.3 filed on Aug. 30, 2016. The present application claims priority to and the benefit of the above-identified applications and the above-identified applications are incorporated by reference herein in their entirety.

TECHNICAL FIELD

Embodiments of the present disclosure relate to a touch substrate and a manufacturing method thereof, a display device, a fingerprint determination device and a method for determining a fingerprint.

BACKGROUND

In recent years, with the development of science and technology, electronic products with a function of biometric recognition have entered into people's lives and work gradually. The fingerprint is able to be used for personal identification because of its uniqueness and invariance, so the fingerprint determination technology is valued by people. At present, a press type fingerprint determination technology and a sliding type fingerprint determination technology which are based on silicon-based technology have been integrated into the electronic products. In the future, people pay attention to the fingerprint determination technology in display regions of the electronic products.

SUMMARY

Embodiments of the present disclosure provide a touch substrate and a manufacturing method thereof, a display device, a fingerprint determination device and a method for determining a fingerprint. The number of signal lines of touch electrodes is reduced in some embodiments of the present disclosure.

At least one embodiment of the present disclosure provides a touch substrate, and the touch substrate includes: a base substrate which at least includes a first region and a second region which are not overlapped with each other; a plurality of touch driving electrodes which are on the base substrate and extend along a first direction; a plurality of touch sensing electrodes which are on the base substrate and extend along a second direction, the second direction intersecting the first direction; and a plurality of signal lines on the base substrate. In the touch substrate, the plurality of touch driving electrodes include a plurality of first touch driving electrodes in the first region and a plurality of second touch driving electrodes in the second region, and each of the first touch driving electrodes and one of the second touch driving electrodes are connected with a same one of the signal lines; and/or the plurality of touch sensing electrodes include a plurality of first touch sensing electrodes in the first region and a plurality of second touch sensing electrodes in the second region, and each of the first touch sensing electrodes and one of the second touch sensing electrodes are connected with a same one of the signal lines.

For example, in a case that each of the first touch driving electrodes is connected to one of the second touch driving electrodes, both a size of the first region along the second direction and a size of the second region along the second direction are greater than or equal to 5 mm; and in a case that each of the first touch sensing electrodes is connected to one of the second touch sensing electrodes, both a size of the first region along the first direction and a size of the second region along the first direction are greater than or equal to 5 mm.

For example, both a pitch of adjacent ones of the touch sensing electrodes and a pitch of adjacent ones of the touch driving electrodes are from 50 microns to 70 microns.

For example, the touch substrate further includes a covering layer which covers the touch driving electrodes and the touch sensing electrodes, and a thickness of the covering layer is smaller than or equal to 300 microns.

For example, the covering layer includes a covering plate, and a thickness of the covering plate is smaller than or equal to 100 microns.

For example, the covering plate is a flexible covering plate.

For example, the covering layer further includes an optical adhesive, and the optical adhesive connects together the covering plate and the base substrate provided with both the touch sensing electrodes and the touch driving electrodes.

For example, a dielectric constant of the optical adhesive ranges from 7 to 15.

For example, the covering layer further includes a polarizer, and the polarizer is at a side, facing the base substrate, of the covering plate.

For example, the base substrate further includes a third region which is not overlapped with the first region and the second region. The plurality of touch driving electrodes further include a plurality of third touch driving electrodes disposed in the third region, and each of the first touch driving electrodes, one of the second touch driving electrodes and one of the third touch driving electrodes are connected with the same one of the signal lines; and/or the plurality of touch sensing electrodes further include a plurality of third touch sensing electrodes disposed in the third region, and each of the first touch sensing electrodes, one of the second touch sensing electrodes and one of the third touch sensing electrodes are connected with the same one of the signal lines.

At least one embodiment of the present disclosure further provides a display device, and the display device includes the touch substrate described in any one of the above embodiments.

At least one embodiment of the present disclosure further provides a fingerprint determination device, and the fingerprint determination device includes the touch substrate described in any one of the above embodiments or the display device described above.

For example, the display device includes a display region and a non-display region outside the display region, and both the plurality of touch driving electrodes and the plurality of touch sensing electrodes included in the touch substrate are in the display region.

At least one embodiment of the present disclosure further provides a method for manufacturing a touch substrate, and the method includes: forming a plurality of touch driving electrodes, so that the touch driving electrodes extend along a first direction; forming a plurality of touch sensing electrodes, so that the touch sensing electrodes extend along a second direction which intersects the first direction; and forming a plurality of signal lines. In the method, the touch driving electrodes, the touch sensing electrodes and the signal lines are formed on a base substrate, and the base substrate at least includes a first region and a second region which are not overlapped with each other. In the method, the plurality of touch driving electrodes include a plurality of first touch driving electrodes in the first region and a plurality of second touch driving electrodes in the second region, and each of the first touch driving electrodes and one of the second touch driving electrodes are connected with a same one of the signal lines; and/or the plurality of touch sensing electrodes include a plurality of first touch sensing electrodes in the first region and a plurality of second touch sensing electrodes in the second region, and each of the first touch sensing electrodes and one of the second touch sensing electrodes are connected with a same one of the signal lines.

At least one embodiment of the present disclosure further provides a method for determining a fingerprint by using the touch substrate described in any one of the above embodiments, and the method includes: determining a touch position according to a capacitance change between the touch driving electrodes and the touch sensing electrodes; and determining a position relation of the touch position, the first region and the second region, in which a fingerprint determination is performed in a case that the touch position is determined to be overlapped with the first region and be outside the second region.

At least one embodiment of the present disclosure further provides a fingerprint determination device, and the fingerprint determination device includes: a base substrate which at least includes a first region and a second region which are not overlapped with each other; a plurality of fingerprint determination driving electrodes which are on the base substrate and extend along a first direction; a plurality of fingerprint determination sensing electrodes which are on the base substrate and extend along a second direction, the second direction intersecting the first direction; and a plurality of signal lines on the base substrate. The plurality of fingerprint determination driving electrodes include a plurality of first fingerprint determination driving electrodes in the first region and a plurality of second fingerprint determination driving electrodes in the second region, and each of the first fingerprint determination driving electrodes and one of the second fingerprint determination driving electrodes are connected with a same one of the signal lines; and/or the plurality of fingerprint determination sensing electrodes include a plurality of first fingerprint determination sensing electrodes in the first region and a plurality of second fingerprint determination sensing electrodes in the second region, and each of the first fingerprint determination sensing electrodes and one of the second fingerprint determination sensing electrodes are connected with a same one of the signal lines.

For example, in a case that each of the first fingerprint determination driving electrodes is connected to one of the second fingerprint determination driving electrodes, both a size of the first region along the second direction and a size of the second region along the second direction are greater than or equal to 5 mm; and in a case that each of the first fingerprint determination sensing electrodes is connected to one of the second fingerprint determination sensing electrodes, both a size of the first region along the first direction and a size of the second region along the first direction are greater than or equal to 5 mm.

For example, both a pitch of adjacent ones of the fingerprint determination sensing electrodes and a pitch of adjacent ones of the fingerprint determination driving electrodes are from 50 to 70 microns.

For example, the fingerprint determination device further includes a covering layer which covers the fingerprint determination driving electrodes and the fingerprint determination sensing electrodes, and a thickness of the covering layer is smaller than or equal to 300 microns.

For example, the covering layer includes a covering plate, and a thickness of the covering plate is smaller than or equal to 100 microns.

BRIEF DESCRIPTION OF THE DRAWINGS

In order to clearly illustrate the technical solution of the embodiments of the present disclosure, the drawings of the embodiments will be briefly described in the following, it is obvious that the described drawings are only related to some embodiments of the present disclosure and thus are not limitative of the present disclosure.

DETAILED DESCRIPTION

In order to make objects, technical details and advantages of the embodiments of the invention apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the words, such as "comprise/comprising", "include/including", etc., mean the components or objects that appear in front of the words to cover the similar components or objects that are listed in the following of the words, but other different components or objects are not excluded. The phrases "connect", "connected", etc., are not limited to a physical connection or mechanical connection, but may include an electrical connection, directly or indirectly. The terms "up", "down", "left", "right", etc., are used to indicate the relative position relation, when the absolute position of the described object is changed, the relative position relation may also be changed accordingly.

A principle of a mutual capacitance detection technology is: a capacitance sensor includes a plurality of driving lines extending along an X direction and a plurality of detection lines extending along a Y direction, the driving lines and the detection lines are connected to a touch control circuit via their respective signal lines, the touch control circuit applies a voltage to the driving lines and detects a signal change of the detection lines, to determine a Y-coordinate of a touch position according to the driving lines and to determine an X-coordinate of the touch position according to the detection lines. For example, in the process of detection, the driving lines along the X direction are scanned line by line; and in scanning each of the driving lines, the signal of each of the detection lines is read. Through a round of scanning, each of the intersections of rows and columns is scanned, and thus a total of X*Y signals are detected by scanning. This detection technology is able to determine coordinates of a plurality of points, and thus is able to realize that a plurality of valley states of a finger and a plurality of ridge states of the finger are detected at a same time according to the capacitances between the capacitance sensor (a combination of the driving lines and the detection lines) and both the valleys and the ridges of the finger, so as to realize a fingerprint determination.

Figure 1:
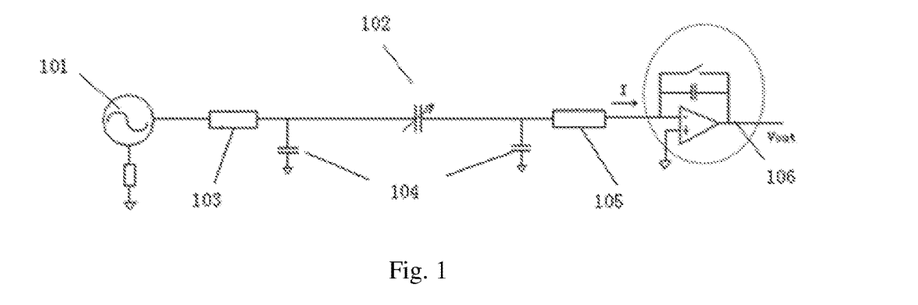
FIG. 1 is an equivalent detection circuit model based on a mutual capacitance detection technology in a touch control circuit.

For example, an equivalent detection circuit model based on the mutual capacitance detection technology in the touch control circuit is illustrated in FIG. 1, in which 101 refers to a signal source, 102 refers to a mutual capacitance between the driving lines and the detection lines, 103 refers to a driving line resistance, 104 refers to a parasitic capacitance formed by the driving lines, the detection lines and a common electrode layer in the touch control circuit, 105 refers to a detection line resistance, and 106 refers to a detection circuit. In a case that a touch of the finger occurs, the touch of the finger is equivalent to a change of the mutual capacitance between the driving lines and the detection lines. The ridges of the finger are close to the capacitance sensor, and thus cause the change of the mutual capacitance to be relatively large. The valleys of the finger are far away from the capacitance sensor, and thus cause the change of the mutual capacitance to be relatively small. According to the detection result Vout of the detection circuit, the change of a resulted weak current I is obtained and then used to distinguish the valleys and the ridges of the finger, and the fingerprint determination is realized.

In research, the inventors of the present disclosure notice that, in the mutual capacitance detection technology, in order to realize the fingerprint determination, the pitch of the driving lines and the pitch of the detection lines are usually range from 50 μm to 70 μm. In this case, in order to achieve a full-screen fingerprint determination (i.e. the fingerprint determination is achieved in a whole display region), thousands of signal lines are required to be arranged outside the display region of a display screen according to the size of the display screen, and the signal lines not only influence the aperture ratio of the display region, but also influence the border size of the display screen.

Figure 2A:
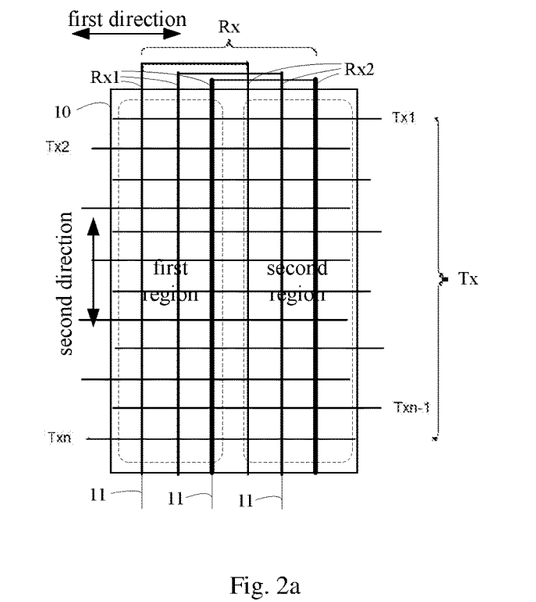
FIG. 2a is a schematic plan view illustrating that touch sensing electrodes in a touch substrate provided by embodiments of the present disclosure are divided to be in two regions.
Figure 2B:
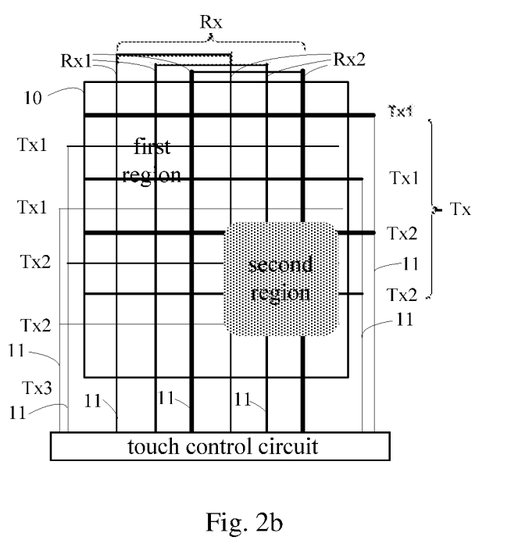
FIG. 2b is a schematic plan view illustrating that both the touch sensing electrodes and touch driving electrodes in the touch substrate provided by the embodiments of the present disclosure are divided to be in two regions.
Figure 2C:
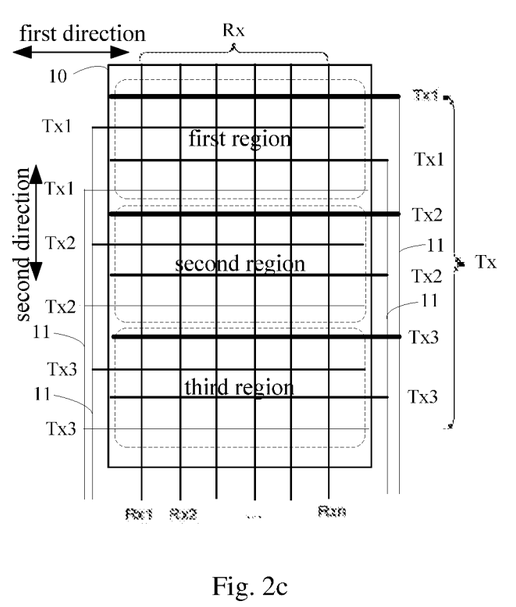
FIG. 2c is a schematic plan view illustrating that the touch driving electrodes in the touch substrate provided by the embodiments of the present disclosure are divided to be in three regions.

At least one embodiment of the present disclosure provides a touch substrate. As illustrated in FIG. 2a to FIG. 2c, the touch substrate includes a base substrate 10 which at least includes a first region and a second region which are not overlapped with each other, a plurality of touch driving electrodes Tx (referring to Tx1 to Txn in FIG. 2a, Tx1 to Tx2 in FIG. 2b, and Tx1 to Tx3 in FIG. 2c) on the base substrate 10, a plurality of touch sensing electrodes Rx (referring to Rx1 to Rx2 in FIG. 2a, Rx1 to Rx2 in FIG. 2b, and Rx1 to Rxn in FIG. 2c) on the base substrate 10, and a plurality of signal lines disposed on the base substrate 10. The touch driving electrodes Tx extend along a first direction; the touch sensing electrodes Rx and the touch driving electrodes Tx are spaced apart (in a direction perpendicular to a surface of the base substrate 10, the touch driving electrodes Tx and the touch sensing electrodes Rx are separated from each other by an insulating layer at intersection positions of the touch driving electrodes Tx and the touch sensing electrodes Rx), the touch sensing electrodes Rx extend along a second direction, and the second direction intersects with the first direction; and each of the signal lines 11 is connected to a touch driving electrode or a touch sensing electrode to lead out the signal of the touch driving electrode or the touch sensing electrode.

In at least one embodiment of the present disclosure, as illustrated in FIG. 2a, the touch sensing electrodes Rx include a plurality of first touch sensing electrodes Rx1 which are arranged in the first region and separated from each other, and a plurality of second touch sensing electrodes Rx2 which are arranged in the second region and separated from each other. Each of the first touch sensing electrodes Rx1 and one of the second touch sensing electrodes Rx2 are connected with a same signal line 11, and each of the second touch sensing electrodes Rx2 and one of the first touch sensing electrodes Rx1 are connected with a same signal line 11. For example, an upper end of the first touch sensing electrode Rx1 is connected to an upper end of the corresponding second touch sensing electrodes Rx2 (for example, the first touch sensing electrode Rx1 and the second touch sensing electrodes Rx2 form a U-shaped structure), and a lower end of one of the first touch sensing electrode Rx1 and the second touch sensing electrode Rx2 is connected to the signal line 11 and a lower end of the other one of the first touch sensing electrode Rx1 and the second touch sensing electrode Rx2 is not connected to the signal line 11. In this way, it is achieved that each of the first touch sensing electrodes Rx1 and one of the second touch sensing electrodes Rx2 connect to a same signal line 11.

In at least another embodiment of the present disclosure, the touch driving electrodes Tx include a plurality of first touch driving electrodes which are arranged in the first region and separated from each other, and a plurality of second touch driving electrodes which are arranged in the second region and separated from each other, each of the first touch driving electrodes and one of the second touch driving electrodes are connected with a same signal line, and each of the second touch driving electrodes and one of the first touch driving electrodes are connected with a same signal line.

In at least another embodiment of the present disclosure, as illustrated in FIG. 2b, the touch sensing electrodes Rx include the plurality of first touch sensing electrodes Rx1 arranged in the first region and separated from each other, and the plurality of second touch sensing electrodes Rx2 arranged in the second region and separated from each other, and each of the first touch sensing electrodes Rx1 and one of the second touch sensing electrodes Rx2 are connected with the same signal line 11, so that the first touch sensing electrode and the second touch sensing electrode are connected with a touch control circuit by the signal line 11. Moreover, the touch driving electrodes Tx include a plurality of first touch driving electrodes Tx1 which are arranged in the first region and separated from each other, and a plurality of second touch driving electrodes Tx2 which are arranged in the second region and separated from each other, and each of the first touch driving electrodes Tx1 and one of the second touch driving electrodes Tx2 are connected with a same signal line 11.

In the embodiments of the present disclosure, a same kind of touch electrodes (the touch driving electrodes or the touch sensing electrodes) are divided to be in a plurality of regions which have no overlapping regions according to the positions of the touch electrodes. The touch electrodes in a same region are separated from each other and connected to different signal lines to connect the touch control circuit (for example, an IC, namely an integrated circuit). The touch electrodes which correspond to each other and are in different regions are connected together and are connected to the touch control circuit via the same signal line. Compared with the mode that each of the touch electrodes is connected to a signal line and different touch electrodes connect to different signal lines respectively, the number of the signal lines in the embodiments of the present disclosure is greatly reduced, so the opening rate of the display region of a display screen in the embodiments of the present disclosure is effectively improved, which is beneficial to the realization of a narrow border design of the display screen.

For example, in at least one embodiment of the present disclosure, as illustrated in FIG. 2c, the base substrate 10 further includes a third region which is not overlapped with the first region and the second region; and the touch driving electrodes Tx further include a plurality of third touch driving electrodes Tx3 disposed in the third region and separated from each other, and each of the first touch driving electrodes Tx1, one of the second touch driving electrodes Tx2 and one of the third touch driving electrodes Tx3 are connected with the same signal line 11. For example, for a product with a resolution of 1920*1080, all the touch driving electrodes (a total of 1920 touch driving electrodes) are divided to be in three regions. For example, the number of the touch driving electrodes in each region is 640, and the touch driving electrodes in three regions are correspondingly connected. In this way, the number of the signal lines of the touch driving electrodes is reduced to ⅓ of the original number. Therefore, the number of the signal lines in the embodiments of the present disclosure is greatly reduced, which is beneficial to the narrow border design.

In the FIG. 2a, the touch sensing electrodes Rx are divided to be in two regions. In the FIG. 2c, the touch driving electrodes Tx are divided to be in three regions. The embodiments of the present disclosure include, but not limited to, the embodiments as illustrated in FIG. 2a to FIG. 2C. Both the touch driving electrodes and touch sensing electrodes may be divided to be in at least two regions (such as two regions, three regions or more regions) according to actual requirements and positions. Further descriptions are given in the following with respect to FIG. 3 and FIG. 4.

Figure 3:
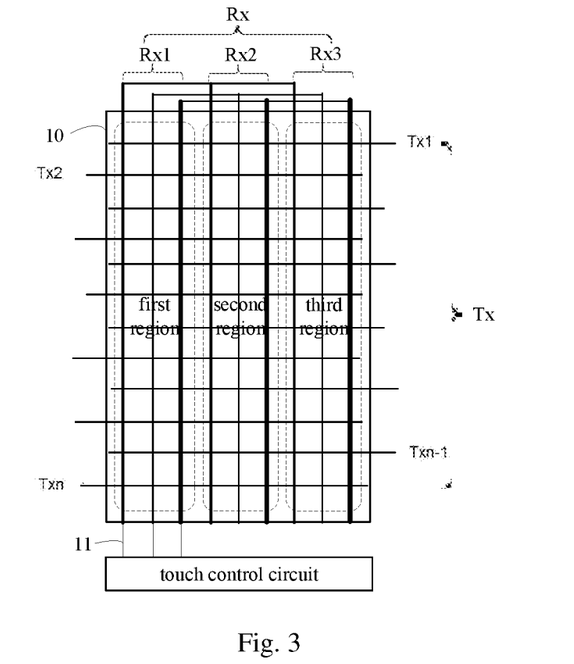
FIG. 3 is a schematic plan view illustrating that the touch sensing electrodes in the touch substrate provided by the embodiments of the present disclosure are divided to be in three regions.

For example, in at least one embodiment of the present disclosure, the touch sensing electrodes Rx are divided to be in three regions. For example, as illustrated in FIG. 3, the touch sensing electrodes Rx further include a plurality of third touch sensing electrodes Rx3 disposed in a third region, and each of the first touch sensing electrodes Rx1, one of the second touch sensing electrodes Rx2 and one of the third touch sensing electrodes Rx3 are connected with the same signal line 11, so as to connect the touch control circuit.

Figure 4:
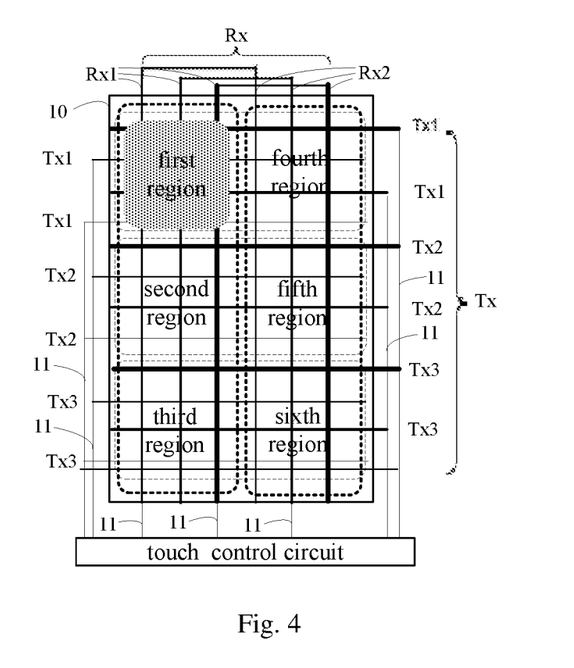
FIG. 4 is a schematic plan view illustrating that the touch sensing electrodes in the touch substrate provided by the embodiments of the present disclosure are divided to be in two regions and the touch driving electrodes in the touch substrate provided by the embodiments of the present disclosure are divided to be in three regions.

For example, in at least one embodiment of the present disclosure, both the touch sensing electrodes Rx and the touch driving electrodes Tx are divided to be in a plurality of regions. For example, as illustrated in FIG. 4, the touch driving electrodes Tx are divided to be in three regions, and the touch sensing electrodes Rx are divided to be in two regions. That is to say, the touch driving electrodes Tx include the first touch driving electrodes Tx1, the second touch driving electrodes Tx2, and the third touch driving electrodes Tx3 disposed in different regions that do not overlap with each other. Each first touch driving electrode Tx1, one corresponding second touch driving electrode Tx2 and one corresponding third touch driving electrode Tx3 are connected to a same signal line 11, so as to connect to the touch control circuit through the signal line 11. The touch sensing electrodes Rx include the first touch sensing electrodes Rx1 and the second touch sensing electrodes Rx2 disposed in different regions that do not overlap with each other. Each first touch sensing electrode Rx1 and one corresponding second touch sensing electrode Rx2 are connected to a same signal line 11, so as to connect to the touch control circuit through the signal line 11.

For example, in any one of the embodiments described above, the number of the touch driving electrodes or the number of the touch sensing electrodes in different regions are equal. For example, the number of the first touch driving electrodes in the first region is equal to the number of the second touch driving electrodes in the second region; and by analogy, the arrangements in other regions are similar.

A solution for realizing a full-screen fingerprint determination is proposed in the embodiments of the present disclosure. For example, in a case that a finger presses a certain region, it is possible to realize the application of fingerprint determination by the touch driving electrodes and the touch sensing electrodes in the region. For example, in a case that the finger presses one of the first region and the second region as illustrated in FIG. 2a and FIG. 2b, or the finger presses one of the first region, the second region and the third region as illustrated in FIG. 2c and FIG. 3, or the finger presses one of the first region to the sixth region as illustrated in FIG. 4, the fingerprint determination is carried out by the touch electrodes in the pressed region. In the embodiments of the present disclosure, it is possible to divide the region provided with the touch electrodes into a plurality of regions according to a size of a screen of a product; and in order to ensure the accuracy of the fingerprint determination, by arranging sizes of the regions, it is possibly to make the finger not press the other one of the regions in pressing a certain one of the regions.

For example, the size of each region is arranged according to a size of the finger. For example, as illustrated in FIG. 2a, in a case that each of the first touch sensing electrodes Rx1 connects to one of the second touch sensing electrodes Rx2, both a size of the first region along the first direction and a size of second region along the first direction are greater than or equal to 5 mm. As illustrated in FIG. 2c, in a case that each of the first touch driving electrodes Tx1 connects to one of the second touch driving electrodes Tx2, both a size of the first region along the second direction and a size of the second region along the second direction are greater than or equal to 5 mm. Similarly, in a case that the touch electrodes are divided to include the touch electrodes in a third region or more regions, the size of the third region and the sizes of the regions along the corresponding direction are larger than or equal to 5 mm. By such an arrangement, it is facilitated that the finger presses only one region and does not press other region in pressing the display screen.

For example, in order to realize the fingerprint determination, a pitch of the adjacent touch electrodes is arranged according to a distance between a valley and a ridge of the finger. For example, both a pitch of adjacent touch sensing electrodes and a pitch of adjacent touch driving electrodes are from 50 microns to 70 microns.

In a capacitive fingerprint determination technology, in a case that a distance between the finger and a fingerprint sensor (i.e. the touch driving electrodes and the touch sensing electrodes) is large (such as greater than 300 μm), a signal of an electric field between the finger and the fingerprint sensor is decreased substantially, which easily makes the fingerprint difficult to be determined. For example, it is beneficial for the fingerprint determination by arranging a thickness and a material of a component, at a touch side, of the fingerprint sensor.

Figure 5:
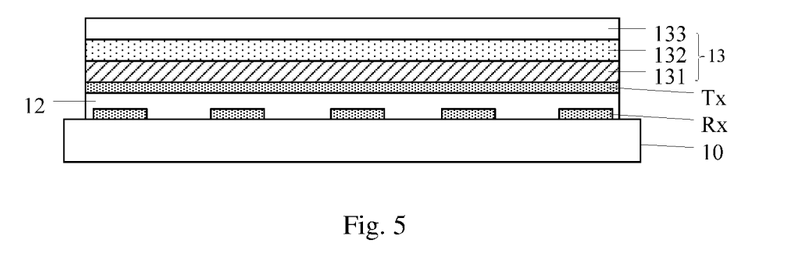
FIG. 5 is a schematic cross-sectional view of the touch substrate provided by the embodiments of the present disclosure.

For example, as illustrated in FIG. 5, the touch substrate provided by at least one embodiment of the present disclosure further includes a covering layer 13 which covers the touch driving electrodes Tx and the touch sensing electrodes Rx (the touch driving electrodes Tx and the touch sensing electrodes Rx are separated by the insulating layer 12 and their locations are interchangeable), and a thickness of the covering layer 13 is smaller than or equal to 300 microns. There is no other layer structure at a side of the covering layer 13, which side is away from the touch driving electrode Tx and the touch sensing electrode Rx; and in this way, in a case of touching, a touch object (such as the finger of the user) contacts the covering layer 13 directly. The thickness of the covering layer 13 is smaller than or equal to 300 microns which benefits to obtain a large capacitance between the touch object (such as the finger) and the touch electrodes, and the capacitance is easily to be detected by the touch control circuit, which is beneficial to the realization of the capacitive fingerprint determination.

For example, the covering layer 13 includes a covering plate 133, the covering plate 133 protects the touch substrate, and a thickness of the covering plate 133 is smaller than or equal to 100 microns. By adopting the covering plate which is thin, it is beneficial to reduce the overall thickness of the covering layer 13, so as to obtain the large capacitance between the finger and the touch electrodes, which is beneficial to realize the capacitive fingerprint determination.

For example, the covering plate 133 is a flexible covering plate. The flexible covering plate is beneficial for preventing the covering plate from being damaged due to a too small thickness when the finger presses the covering plate. On the other hand, the adopting of the flexible covering plate is beneficial to the application of the embodiments of the present disclosure in a flexible display screen.

For example, the covering layer 13 further includes an optical adhesive (OCA) 132, and the covering plate 133 is connected with the base substrate 10 provided with both the touch driving electrodes Tx and the touch sensing electrodes Rx by the optical adhesive 132. For example, a dielectric constant of the optical adhesive 132 ranges from 7 to 15. The optical adhesive adopts a material with a large dielectric, which helps to increase the capacitance between the finger and the touch electrodes, and benefits to improve the detection result of the capacitive fingerprint determination.

For example, the covering layer 13 further includes a polarizer 131, and the polarizer 131 is arranged at a side of the covering plate 133, which side faces the base substrate 10. For example, the polarizer 131 is at a side, facing the base substrate 10, of the optical adhesive 132. The polarizer 131 prevents the touch driving electrodes Tx and the touch sensing electrodes Rx disposed below the polarizer 131 from reflecting light. The polarizer 131 further prevents other electrode disposed below the polarizer 131 from reflecting light. For example, the polarizer 131 adopts a thin polarizer to reduce the effect on the thickness of the covering layer 13.

For example, the base substrate 10 is a flexible plastic substrate which is made of polyimide (PI), or similar materials, which benefits to the realization of the flexible display screen.

It needs to be explained that the structures of the touch driving electrode Tx and touch sensing electrode Rx include, but are not limited to, the embodiment as illustrated in FIG. 5, or can adopt other structures commonly used in this field, as long as a mutual capacitance is formed between the touch driving electrode Tx and the touch sensing electrode Rx.

At least one embodiment of the present disclosure further provides a display device, and the display device includes the touch substrate provided by any one of the above embodiments of the present disclosure.

For example, the display device provided by the embodiment of the present disclosure is an active luminescent display device. In this way, the display device is simple in structure and is beneficial to the realization of the flexible display screen. For example, the touch electrodes (the touch driving electrodes and the touch sensing electrodes) of the active luminescent display device used for the fingerprint determination are integrated into the effective display region of a luminous board of the luminescent display device to realize a full-screen fingerprint determination. For example, the display device is an active luminescent display device such as an OLED (organic light-emitting diode) display device or an LED (light-emitting diode) display device.

Figure 6:
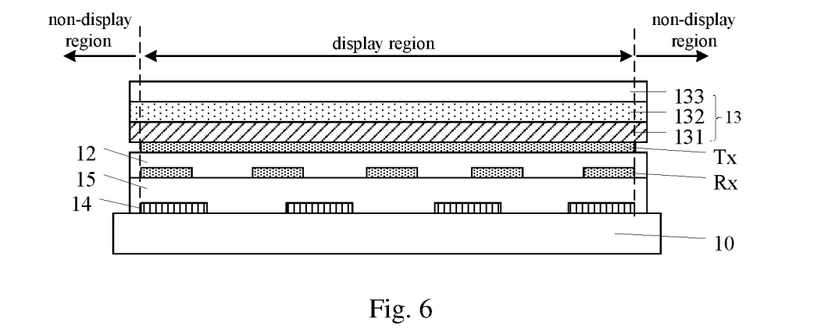
FIG. 6 is a schematic cross-sectional view of a display device provided by the embodiments of the present disclosure.

For example, as illustrated in FIG. 6, the display device provided by at least one embodiment of the present disclosure includes a plurality of light-emitting units 14 arranged on the base substrate 10 and includes switch elements (FIG. 6 is not shown) connected with the light-emitting units 14 respectively. For example, the light-emitting units 14 are LEDs or OLEDs; and in order to prevent water and oxygen from entering the light-emitting units 14, the light-emitting units 14 are covered by a sealed film (an organic film or an inorganic film or a laminated structure of the organic film and the inorganic film). For example, the switch elements 14 are LTPS (low temperature polysilicon) thin film transistors or other types of thin film transistors. By the arrangement of the light-emitting units 14, a display function is realized by the embodiments of the present disclosure. The light-emitting units 14 are LEDs or OLEDs or the like, which benefits the embodiments of the present disclosure to be used in the flexible display screen.

The display device further includes other structures, for example, an insulating layer 15 covering the light-emitting units 14, a gate driver (for example, a gate driver on array), a source driver, gate lines and data lines (not illustrated in FIG. 6).

FIG. 6 takes the display device being the active luminescent display device as an example. The embodiments of the present disclosure include, but are not limited to, the active luminescent display device. For example, the display device is a liquid crystal display device.

For example, as illustrated in FIG. 6, the display device includes a display region and a non-display region outside the display region, and the plurality of touch driving electrodes and the plurality of touch sensing electrodes included in the touch substrate are located in the display region. The display device realizes the full-screen fingerprint determination (that is, the fingerprint determination is realized in the whole display region).

For example, the display device is an in-cell type display device or an on-cell type display device.

At least one embodiment of the present disclosure further provides a fingerprint determination device, and the fingerprint determination device includes the touch substrate provided by any one of the embodiments described above or the display device provided by any one of the embodiments described above.

Figure 7A:
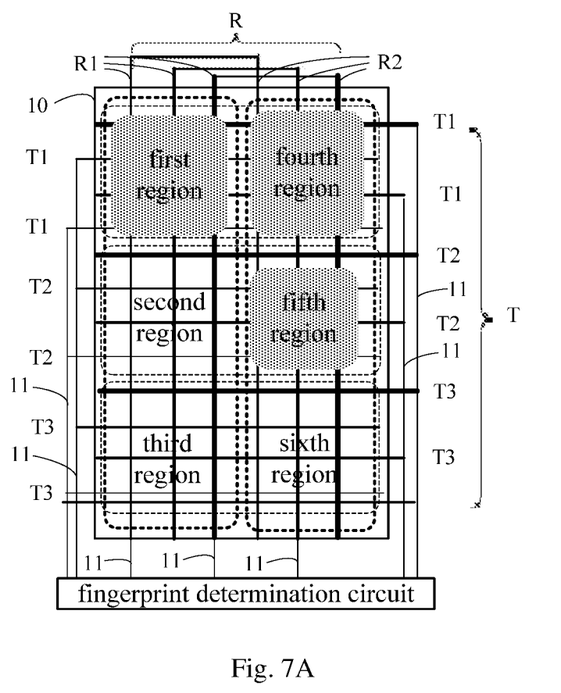
FIG. 7A is a schematic plan view of a fingerprint determination device provided by the embodiments of the present disclosure.

At least one embodiment of the present disclosure further provides another fingerprint determination device. As illustrated in FIG. 7A, the fingerprint determination device includes: a base substrate 10 which at least includes a first region and a second region which are not overlapped with each other; a plurality of fingerprint determination driving electrodes T, which are disposed on the base substrate 10 and extend along a first direction; a plurality of fingerprint determination sensing electrodes R which are disposed on the base substrate 10 and extend along a second direction, the second direction intersecting the first direction; and a plurality of signal lines disposed on the base substrate 10. The plurality of fingerprint determination driving electrodes T include a plurality of first fingerprint determination driving electrodes T arranged in the first region and a plurality of second fingerprint determination driving electrodes T arranged in the second region, and each of the first fingerprint determination driving electrodes T and one of the second fingerprint determination driving electrodes T are connected with a same signal line 11; and/or the plurality of fingerprint determination sensing electrodes R include a plurality of first fingerprint determination sensing electrodes R arranged in the first region and a plurality of second fingerprint determination sensing electrodes R arranged in the second region, and each of the first fingerprint determination sensing electrodes R and one of the second fingerprint determination sensing electrodes R are connected with a same signal line 11.

Each of the fingerprint determination driving electrodes T and the fingerprint determination sensing electrodes R is divided to be in at least two regions, for example, three regions or more regions. For example, as illustrated in FIG. 7A, the fingerprint determination driving electrodes T are divided to be in three regions, and the fingerprint determination sensing electrodes R are divided to be in two regions. That is to say, the fingerprint determination driving electrodes T include the first fingerprint determination driving electrodes T1, the second fingerprint determination driving electrodes T2, and third fingerprint determination driving electrodes T3 disposed in different regions that do not overlap with each other, and each first fingerprint determination driving electrode T1, one corresponding second fingerprint determination driving electrode T2 and one corresponding third fingerprint determination driving electrode T3 are connected to a same signal line 11, so as to connect to a fingerprint determination circuit through the signal line 11; and the fingerprint determination sensing electrode R include the first fingerprint determination sensing electrodes R1 and the second fingerprint determination sensing electrodes R2 disposed in different regions that do not overlap with each other, and each first fingerprint determination sensing electrodes R1 and one corresponding second fingerprint determination sensing electrode R2 are connected to a same signal line 11, so as to connect to the fingerprint determination circuit through the signal line 11.

In the embodiments of the present disclosure, a same kind of fingerprint determination electrodes (the fingerprint determination driving electrodes or the fingerprint determination sensing electrodes) are divided to be in a plurality of regions which are not overlapped with each other according to the positions of the fingerprint determination electrodes, the fingerprint determination electrodes in a same region are separated from each other and connected to the fingerprint determination circuit (such as an IC, namely an integrated circuit) via different signal lines. The corresponding fingerprint determination electrodes in different regions are connected together and connected to the fingerprint determination circuit via a same signal line. Compared with the mode that each of the fingerprint determination electrodes is connected to a signal line and different fingerprint determination electrodes connect to different signal lines, the number of the signal lines in the embodiments of the present disclosure is greatly reduced, so the opening rate of the display region in the embodiments of the present disclosure is effectively improved and it is facilitated to realize the narrow border design.

For example, in a case that each of the first fingerprint determination driving electrodes connects to one of the second fingerprint determination driving electrodes, both a size of the first region along the second direction and a size of the second region along the second direction are greater than or equal to 5 mm. In a case that each of the first fingerprint determination sensing electrodes connects to one of the second fingerprint determination sensing electrodes, both a size of the first region along the first direction and a size of the second region along the first direction are greater than or equal to 5 mm. By such an arrangement, it is facilitated that the finger presses only one region and does not press other region in pressing the screen of the fingerprint determination device.

For example, in order to realize the fingerprint determination, a pitch of the adjacent fingerprint determination electrodes is arranged according to the distance between the valley and the ridge of the finger. For example, both a pitch of adjacent fingerprint determination sensing electrodes and a pitch of adjacent fingerprint determination driving electrodes are from 50 microns to 70 microns.

Figure 7B:
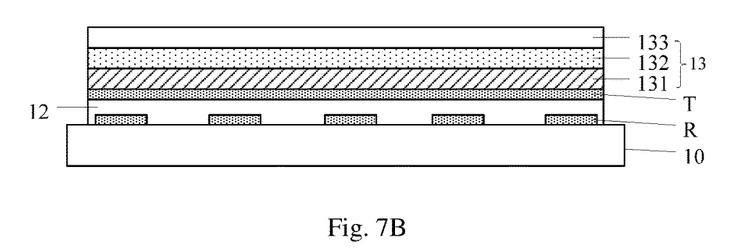
FIG. 7B is a schematic cross-sectional view of the fingerprint determination device provided by the embodiments of the present disclosure.

For example, as illustrated in FIG. 7B, the fingerprint determination device provided by at least one embodiment of the present disclosure further includes a covering layer 13 which covers the fingerprint determination driving electrodes T and the fingerprint determination sensing electrodes R, and a thickness of the covering layer 13 is smaller than or equal to 300 microns. There is no other layer structures at a side of the covering layer 13, which side is away from the fingerprint determination driving electrodes T and the fingerprint determination sensing electrodes R, so that in a case of touching, the touch object (such as the finger of the user) contacts the covering layer 13 directly. The thickness of the covering layer 13 is smaller than or equal to 300 microns which benefits to obtain a large capacitance between the touch object (such as the finger) and the fingerprint determination electrodes, and the capacitance is easily to be detected by the fingerprint determination circuit, which is beneficial to the realization of the capacitive fingerprint determination.

For example, the covering layer 13 includes a covering plate 133, the covering plate 133 protects the structure it covers, and a thickness of the covering plate 133 is smaller than or equal to 100 microns. By adopting the covering plate which is thin, it is beneficial to reduce the overall thickness of the covering layer 13, so as to obtain the large capacitance between the finger and the fingerprint determination electrode, which is beneficial to the realization of the capacitive fingerprint determination.

For example, the covering plate 133 is a flexible covering plate. The flexible covering plate is beneficial for preventing the covering plate from being damaged because the covering plate is too thin when the finger presses the covering plate. On the other hand, the adopting of the flexible covering plate is beneficial to the application of the embodiments of the present disclosure in the flexible display screen.

For example, the covering layer 13 further includes an optical adhesive (OCA) 132, and the covering plate 133 is connected with the base substrate 10 provided with the fingerprint determination driving electrodes T and the fingerprint determination sensing electrodes R by the optical adhesive 132. For example, a dielectric constant of the optical adhesive 132 ranges from 7 to 15. The optical adhesive adopts a material with a large dielectric, which helps to increase the capacitance between the finger and the fingerprint determination electrodes, and benefits to improve the detection result of the capacitive fingerprint determination.

For example, the covering layer 13 further includes a polarizer 131, and the polarizer 131 is arranged at a side of the covering plate 133, which side faces the base substrate 10. For example, the polarizer 131 is at a side, facing the base substrate 10, of the optical adhesive 132. The polarizer 131 prevents the fingerprint determination driving electrodes T and the fingerprint determination sensing electrodes Rx disposed below the polarizer 131 from reflecting light. And the polarizer 131 further prevents other electrodes disposed below the polarizer 131 from reflecting light. For example, the polarizer 131 adopts a thin polarizer to reduce the effect on the thickness of the covering layer 13.

Figure 8:
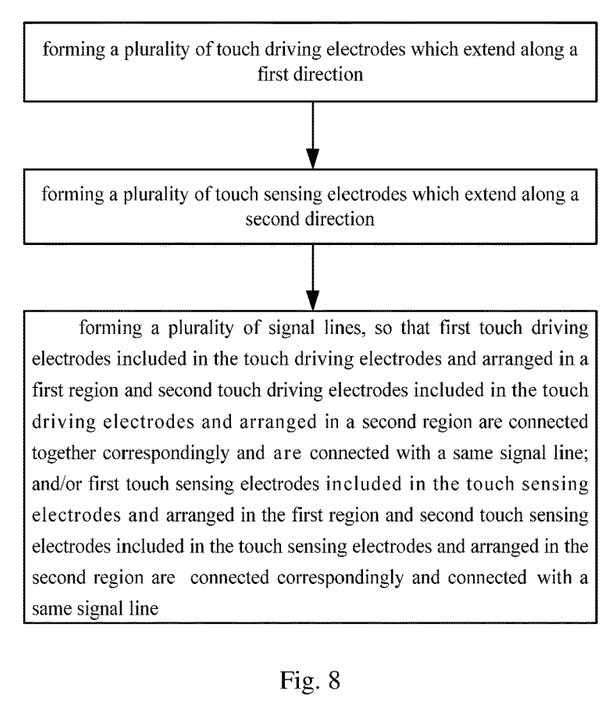
FIG. 8 is a flow chart of a method for manufacturing the touch substrate provided by the embodiments of the present disclosure.

At least one embodiment of the present disclosure further provides a method for manufacturing a touch substrate, as illustrated in FIG. 8, the method includes: forming a plurality of touch driving electrodes which extend along a first direction; forming a plurality of touch sensing electrodes, so that the touch sensing electrodes extend along a second direction which intersects the first direction; and forming a plurality of signal lines. In the manufacturing method, the touch driving electrodes, the touch sensing electrodes and the signal lines are disposed on the base substrate, and the base substrate at least includes a first region and a second region which are not overlapped with each other. The plurality of touch driving electrodes include a plurality of first touch driving electrodes arranged in the first region and a plurality of second touch driving electrodes arranged in the second region, and each of the first touch driving electrodes and one of the second touch driving electrodes are connected with a same signal line; and/or the plurality of touch sensing electrodes include a plurality of first touch sensing electrodes arranged in the first region and a plurality of second touch sensing electrodes arranged in the second region, and each of the first touch sensing electrodes and one of the second touch sensing electrodes are connected with a same signal line.

In the above method, the order of forming the touch driving electrodes, the touch sensing electrodes and the signal lines are not limited in the embodiments of the present disclosure. For example, the schematic plan view of the touch substrate prepared by the method in the embodiments of the present disclosure is illustrated in FIG. 2 to FIG. 4, and detailed descriptions will be omitted herein.

For example, as illustrated in FIG. 5, the manufacturing method provided by at least one embodiment of the present disclosure further includes: forming a covering layer 13 on the base substrate 10 after the touch driving electrodes Tx and the touch sensing electrodes Rx are formed on the base substrate 10, the covering layer 13 includes an optical adhesive (OCA) 132 and a covering plate 133, and the optical adhesive 132 connects the cover plate 133 to the base substrate 10. For example, the optical adhesive 132 adopts a material with a large dielectric, which helps to increase the capacitance between the finger and the touch electrodes, and benefits to improve the detection result of the capacitive fingerprint determination.

For example, the forming the covering layer further include: forming a polarizer 131 that covers the touch driving electrodes Tx and the touch sensing electrodes Rx, to prevent the touch electrodes from reflecting light.

For example, the method for manufacturing the touch substrate illustrated in FIG. 5 includes the following steps of step S51 to step S53.

S51: forming the touch driving electrodes Tx and the touch sensing electrodes Rx and an insulating layer that separates the touch driving electrodes Tx from the touch sensing electrodes Rx on the base substrate 10. For example, in this step, both the touch driving electrodes Tx and the touch sensing electrodes Rx are made of a transparent conductive material (for example, indium tin oxide and other transparent conductive metal oxides), and the positions of the touch driving electrodes Tx and the touch sensing electrodes Rx can be interchanged.

S52: attaching the polarizer 131 to the touch driving electrodes Tx and the touch sensing electrodes Rx.

S53: coating the optical adhesive 132 on the polarizer 131, and then arranging the covering plate 133 on the optical adhesive 132 to provide a surface protection for the touch substrate.

For example, in the manufacturing method provided by at least another embodiment of the present disclosure, the touch driving electrodes Tx and the touch sensing electrodes Rx are formed on the covering plates 133, and then the covering plate 133 provided with the touch driving electrodes Tx and the touch sensing electrodes Rx is connected to the base substrate 10 through the optical adhesive 132.

Figure 9:
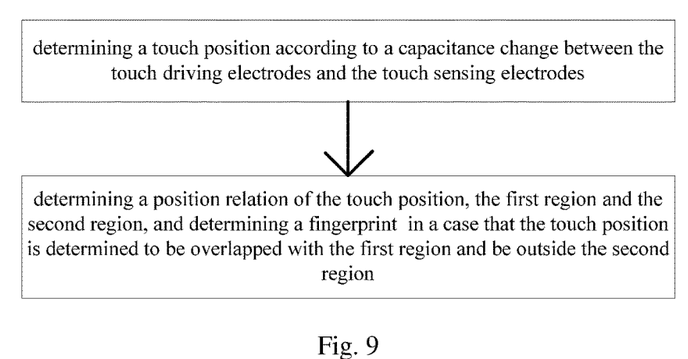
FIG. 9 is a flow chart of a method for determining a fingerprint provided by the embodiments of the present disclosure.

At least one embodiment of the present disclosure further provides a method for determining a fingerprint by using the touch substrate in any one of the embodiments described above. As illustrated in FIG. 9, the method includes: determining a touch position according to a capacitance change between the touch driving electrodes and the touch sensing electrodes; and determining a position relation of the touch position, the first region and the second region, in which a fingerprint determination is performed in a case that the touch position is determined to be overlapped with the first region and be outside the second region.

For example, the determining the touch position and the determining the position relation of the touch position, the first region and the second region are realized by the touch control circuit on the touch substrate.

Similarly, in a case that the touch driving electrodes or the touch sensing electrodes are divided to be in more regions, the method provided by the embodiments of the present disclosure includes: determining a fingerprint in a case that the touch position is determined to be overlapped with one region and be outside the rest regions. For example, in a situation that the touch position is determined to be overlapped with only one of the first region and second region as illustrated in FIG. 2a and FIG. 2b, or in a situation that the touch position is determined to be overlapped with only one of the first region, the second region and the third region as illustrated in FIG. 2C or FIG. 3, or in a situation that the touch position is determined to be overlapped with only one of the first region to the sixth region, the fingerprint determination is carried out.

The embodiments of the touch substrate and the manufacturing method thereof, the display device, the fingerprint determination device and the method for determining the fingerprint can be referenced to each other. In the absence of conflict, the embodiments of the present disclosure and the features in the embodiments can be combined with each other to obtain new embodiments.

What are described above is related to the illustrative embodiments of the disclosure only and not limitative to the scope of the disclosure. The scopes of the disclosure are defined by the accompanying claims.

The application claims priority of Chinese Patent Application No. 201610772827.3 filed on Aug. 30, 2016, the disclosure of which is incorporated herein by reference in its entirety as part of the present application.

What is claimed is:

1. A touch substrate, comprising:
   a base substrate, wherein the base substrate at least comprises a first region and a second region which are not overlapped with each other;
   a plurality of touch driving electrodes, wherein the touch driving electrodes are on the base substrate and extend along a first direction;
   a plurality of touch sensing electrodes, wherein the touch sensing electrodes are on the base substrate and extend along a second direction, and the second direction intersects the first direction; and
   a plurality of signal lines connected with the plurality of touch driving electrodes and the plurality of touch sensing electrodes, wherein the plurality of signal lines are located on the base substrate outside of a region in which the plurality of touch driving electrodes and the plurality of touch sensing electrodes are located,
   wherein the plurality of touch driving electrodes comprises a plurality of first touch driving electrodes in the first region and a plurality of second touch driving electrodes in the second region, and each of the first touch driving electrodes and one of the second touch driving electrodes are connected with a same one of the signal lines; and/or
   the plurality of touch sensing electrodes comprises a plurality of first touch sensing electrodes in the first region and a plurality of second touch sensing electrodes in the second region, and each of the first touch sensing electrodes and one of the second touch sensing electrodes are connected with a same one of the signal lines.

2. The touch substrate according to claim 1, wherein
   in a case that each of the first touch driving electrodes is connected to one of the second touch driving electrodes, a size of the first region along the second direction and a size of the second region along the second direction are both greater than or equal to 5 mm; and
   in a case that each of the first touch sensing electrodes is connected to one of the second touch sensing electrodes, a size of the first region along the first direction and a size of the second region along the first direction are both greater than or equal to 5 mm.

3. The touch substrate according to claim 1, wherein a pitch of adjacent ones of the touch sensing electrodes and a pitch of adjacent ones of the touch driving electrodes are both from 50 microns to 70 microns.

4. The touch substrate according to claim 1, further comprising a covering layer configured to cover the touch driving electrodes and the touch sensing electrodes, wherein a thickness of the covering layer is smaller than or equal to 300 microns.

5. The touch substrate according to claim 4, wherein the covering layer comprises a covering plate, and a thickness of the covering plate is smaller than or equal to 100 microns.

6. The touch substrate according to claim 5, wherein the covering plate is a flexible covering plate.

7. The touch substrate according to claim 5, wherein the covering layer further comprises an optical adhesive, and the optical adhesive is configured to connect together the covering plate and the base substrate provided with both the touch sensing electrodes and the touch driving electrodes.

8. The touch substrate according to claim 7, wherein a dielectric constant of the optical adhesive ranges from 7 to 15.

9. The touch substrate according to claim 5, wherein the covering layer further comprises a polarizer, and the polarizer is at a side, facing the base substrate, of the covering plate.

10. The touch substrate according to claim 1, wherein the base substrate further comprises a third region which does not overlap the first region and the second region, wherein
    the plurality of touch driving electrodes further comprises a plurality of third touch driving electrodes in the third region, and each of the first touch driving electrodes, one of the second touch driving electrodes, and one of the third touch driving electrodes are connected with the same one of the signal lines; and/or
    the plurality of touch sensing electrodes further comprises a plurality of third touch sensing electrodes in the third region, and each of the first touch sensing electrodes, one of the second touch sensing electrodes, and one of the third touch sensing electrodes are connected with the same one of the signal lines.

11. A display device, comprising the touch substrate according to claim 1.

12. The display device according to claim 11, wherein the display device comprises a display region and a non-display region outside of the display region, and both the plurality of touch driving electrodes and the plurality of touch sensing electrodes included in the touch substrate are in the display region.

13. A fingerprint determination device, comprising the touch substrate according to claim 1.

14. A method for determining a fingerprint by using the touch substrate according to claim 1, comprising:
- determining a touch position according to a capacitance change between the touch driving electrodes and the touch sensing electrodes; and
- determining a position relation of the touch position, the first region, and the second region, wherein a fingerprint determination is performed based on a determination that the touch position is overlapped with the first region and outside of the second region.

15. A method for manufacturing a touch substrate, comprising:
- forming a plurality of touch driving electrodes, wherein the touch driving electrodes extend along a first direction;
- forming a plurality of touch sensing electrodes, wherein the touch sensing electrodes extend along a second direction, and the second direction intersects the first direction; and
- forming a plurality of signal lines connected with the plurality of touch driving electrodes and the plurality of touch sensing electrodes, wherein the plurality of signal lines are located outside of a region in which the plurality of touch driving electrodes and the plurality of touch sensing electrodes are located;
- wherein the touch driving electrodes, the touch sensing electrodes, and the signal lines are formed on a base substrate, and the base substrate at least comprises a first region and a second region which are not overlapped with each other,
- wherein
  - the plurality of touch driving electrodes comprises a plurality of first touch driving electrodes in the first region and a plurality of second touch driving electrodes in the second region, and each of the first touch driving electrodes and one of the second touch driving electrodes are connected with a same one of the signal lines; and/or
  - the plurality of touch sensing electrodes comprise a plurality of first touch sensing electrodes in the first region and a plurality of second touch sensing electrodes in the second region, and each of the first touch sensing electrodes and one of the second touch sensing electrodes are connected with a same one of the signal lines.

16. A fingerprint determination device, comprising:
- a base substrate, wherein the base substrate at least comprises a first region and a second region which are not overlapped with each other;
- a plurality of fingerprint determination driving electrodes, wherein the fingerprint determination driving electrodes are on the base substrate and extend along a first direction;
- a plurality of fingerprint determination sensing electrodes, wherein the fingerprint determination sensing electrodes are on the base substrate and extend along a second direction, and the second direction intersects the first direction; and
- a plurality of signal lines, wherein the signal lines are on the base substrate,
- wherein
  - the plurality of fingerprint determination driving electrodes comprises a plurality of first fingerprint determination driving electrodes in the first region and a plurality of second fingerprint determination driving electrodes in the second region, each of the first fingerprint determination driving electrodes and one of the second fingerprint determination driving electrodes are connected with a same one of the signal lines, and overlap same fingerprint determination sensing electrodes; and/or
  - the plurality of fingerprint determination sensing electrodes comprises a plurality of first fingerprint determination sensing electrodes in the first region and a plurality of second fingerprint determination sensing electrodes in the second region, each of the first fingerprint determination sensing electrodes and one of the second fingerprint determination sensing electrodes are connected with a same one of the signal lines, and overlap same fingerprint determination driving electrodes.

17. The fingerprint determination device according to claim 16, wherein
- in a case that each of the first fingerprint determination driving electrodes is connected to one of the second fingerprint determination driving electrodes, a size of the first region along the second direction and a size of the second region along the second direction are both greater than or equal to 5 mm; and
- in a case that each of the first fingerprint determination sensing electrodes is connected to one of the second fingerprint determination sensing electrodes, a size of the first region along the first direction and a size of the second region along the first direction are both greater than or equal to 5 mm.

18. The fingerprint determination device according to claim 16, wherein a pitch of adjacent ones of the fingerprint determination sensing electrodes and a pitch of adjacent ones of the fingerprint determination driving electrodes are both from 50 to 70 microns.

19. The fingerprint determination device according to claim 16, further comprising a covering layer which covers the fingerprint determination driving electrodes and the fingerprint determination sensing electrodes, wherein a thickness of the covering layer is smaller than or equal to 300 microns.

20. The fingerprint determination device according to claim 19, wherein the covering layer comprises a covering plate, and a thickness of the covering plate is smaller than or equal to 100 microns.

* * * * *